(12) United States Patent
Papallo et al.

(10) Patent No.: US 7,986,503 B2
(45) Date of Patent: Jul. 26, 2011

(54) CIRCUIT PROTECTION SYSTEM

(75) Inventors: Thomas F. Papallo, Farmington, CT (US); Gregory P. Lavoie, Bristol, CT (US); John S. Vandevanter, East Granby, CT (US)

(73) Assignee: General Electric Company, Schenectady, NY (US)

( * ) Notice: Subject to any disclaimer, the term of this patent is extended or adjusted under 35 U.S.C. 154(b) by 1708 days.

(21) Appl. No.: 10/662,971

(22) Filed: Sep. 15, 2003

(65) Prior Publication Data
US 2004/0130837 A1    Jul. 8, 2004

Related U.S. Application Data

(60) Provisional application No. 60/438,159, filed on Jan. 6, 2003.

(51) Int. Cl.
*H02H 3/00*    (2006.01)

(52) U.S. Cl. ........................ 361/62; 361/64

(58) Field of Classification Search .................... 361/64
See application file for complete search history.

(56) References Cited

U.S. PATENT DOCUMENTS

| | | | |
|---|---|---|---|
| 4,689,708 A | 8/1987 | Hager et al. | |
| 5,805,394 A | 9/1998 | Glennon | |
| 5,875,088 A * | 2/1999 | Matsko et al. | 361/96 |
| 6,167,329 A * | 12/2000 | Engel et al. | 361/93.2 |
| 6,411,865 B1 * | 6/2002 | Qin et al. | 700/286 |

OTHER PUBLICATIONS

International Search Report dated Nov. 18, 2004; for corresponding PCT Application No. PCT/US04/00055.

* cited by examiner

*Primary Examiner* — Jared J Fureman
*Assistant Examiner* — Terrence R Willoughby
(74) *Attorney, Agent, or Firm* — Ohlandt, Greeley, Ruggiero & Perle, L.L.P.

(57) ABSTRACT

A circuit protection system is provided that utilizes a single state definition for each of the zones of protection of the circuit to increase computational efficiency. Multiple zone protective functions can be performed on a single zone of protection and can reference the single state definition.

43 Claims, 8 Drawing Sheets

CIRCUIT PROTECTION SYSTEM

CROSS REFERENCE TO RELATED APPLICATIONS

This application claims benefit of U.S. Provisional Application Ser. No. 60/438,159 filed on Jan. 6, 2003, the content of which is incorporated by reference herein.

BACKGROUND OF THE INVENTION

1. Field of the Invention

This disclosure relates generally to power distribution systems and more particularly, to a method and apparatus for a circuit protection system providing multiple zone protective functions for zone protection throughout the system.

2. Description of the Prior Art

In power distribution systems, power is distributed to various loads and is typically divided into branch circuits, which supply power to specified loads. The branch circuits can also be connected to other power distribution equipment.

Due to the concern of an abnormal power condition in the system, i.e., a fault, it is known to provide circuit protective devices or power switching devices, e.g., circuit breakers, to protect the circuit. The circuit breakers seek to prevent or minimize damage and typically function automatically. The circuit breakers also seek to minimize the extent and duration of electrical service interruption in the event of a fault.

It is further known to open and close these circuit breakers based upon statically defined zones of protection within the configuration of the power distribution system. The contemporary protection system applies algorithms based upon electrical properties of these statically defined zones and clears the fault through the use of circuit breakers disposed within the statically defined zones of protection.

Such a contemporary system fails to account for changes to the state, topology or configuration of the power distribution system, such as power flow changes resulting from the opening or closing of circuit breakers. The failure of the protection system to adapt to the dynamics of the state of the power distribution system results in the application of incorrect algorithms and unwanted functions of power control devices based upon the erroneous, static state within the zone of protection. This increases the risk of damage to the system, such as failure to timely clear a fault. This also decreases the efficiency of the system, such as through untimely opening of circuit breakers and nuisance tripping, and can increase the extent and duration of electrical service interruption in the event of a fault.

Accordingly, there is a need for circuit protection systems incorporated into power distribution systems that decrease the risk of damage and increase efficiency of the power distribution system. There is a further need for protection systems that can vary the zones of protection and account for the changing state within the zones as the power distribution system changes. There is also a need for protection systems that provide optimized protection without sacrificing selectivity. There is additionally a need for computationally efficient techniques for performing complex zone functions on the varying zones of protection.

SUMMARY OF THE INVENTION

In one aspect, a method of protecting a circuit having power switching devices is provided. The method comprises defining characteristics of a zone of protection of the circuit, defining a protection matrix based at least in part upon the characteristics, and performing a zone protective function on the zone of protection using the protection matrix.

In another aspect, a method of protecting a circuit having power switching devices is provided. The method comprises defining a plurality of combinations of states of the power switching devices that are disposed in a zone of protection of the circuit. Each of the states are either opened or closed. The method further comprises defining characteristics of the zone of protection based at least in part upon the plurality of combinations of the states of the power switching devices disposed in the zone of protection. The method further comprises performing a zone protective function on the zone of protection based at least in part upon the characteristics. The characteristics are actual and possible characteristics of the zone of protection.

In yet another aspect, a method of protecting a circuit having power switching devices is provided which comprises defining a plurality of configurations for a zone of protection of the circuit. The plurality of configurations are actual and possible configurations. The plurality of configurations are based at least in part upon states of the power switching devices disposed in the zone of protection. Each of the states are either opened or closed. The method further comprises defining a plurality of coefficients for a zone protective function based at least in part upon the plurality of configurations, determining a first topology for the zone of protection, selecting at least one of the plurality of coefficients based upon the first topology, and performing the zone protective function on the zone of protection based at least in part upon the at least one of the plurality of coefficients that has been selected. The first topology is based upon a first status for each of the power switching devices disposed in the zone of protection. The first status is either opened or closed.

In a further aspect, a protection system coupled to a circuit having power switching devices and a zone of protection is provided. The protection system comprises a control processing unit being communicatively coupled to the power switching devices. The control processing unit performs a zone protective function on the zone of protection based at least in part upon characteristics of the zone of protection. The characteristics are actual and possible characteristics.

In still a further aspect, a power distribution system is provided which comprises a circuit having power switching devices and a zone of protection. The system further comprises a control processing unit communicatively coupled to the power switching devices. The control processing unit performs a zone protective function on the zone of protection based at least in part upon characteristics of the zone of protection. The characteristics are actual and possible characteristics.

The above-described and other features and advantages of the present disclosure will be appreciated and understood by those skilled in the art from the following detailed description, drawings, and appended claims.

DETAILED DESCRIPTION OF THE INVENTION

Figure 1:
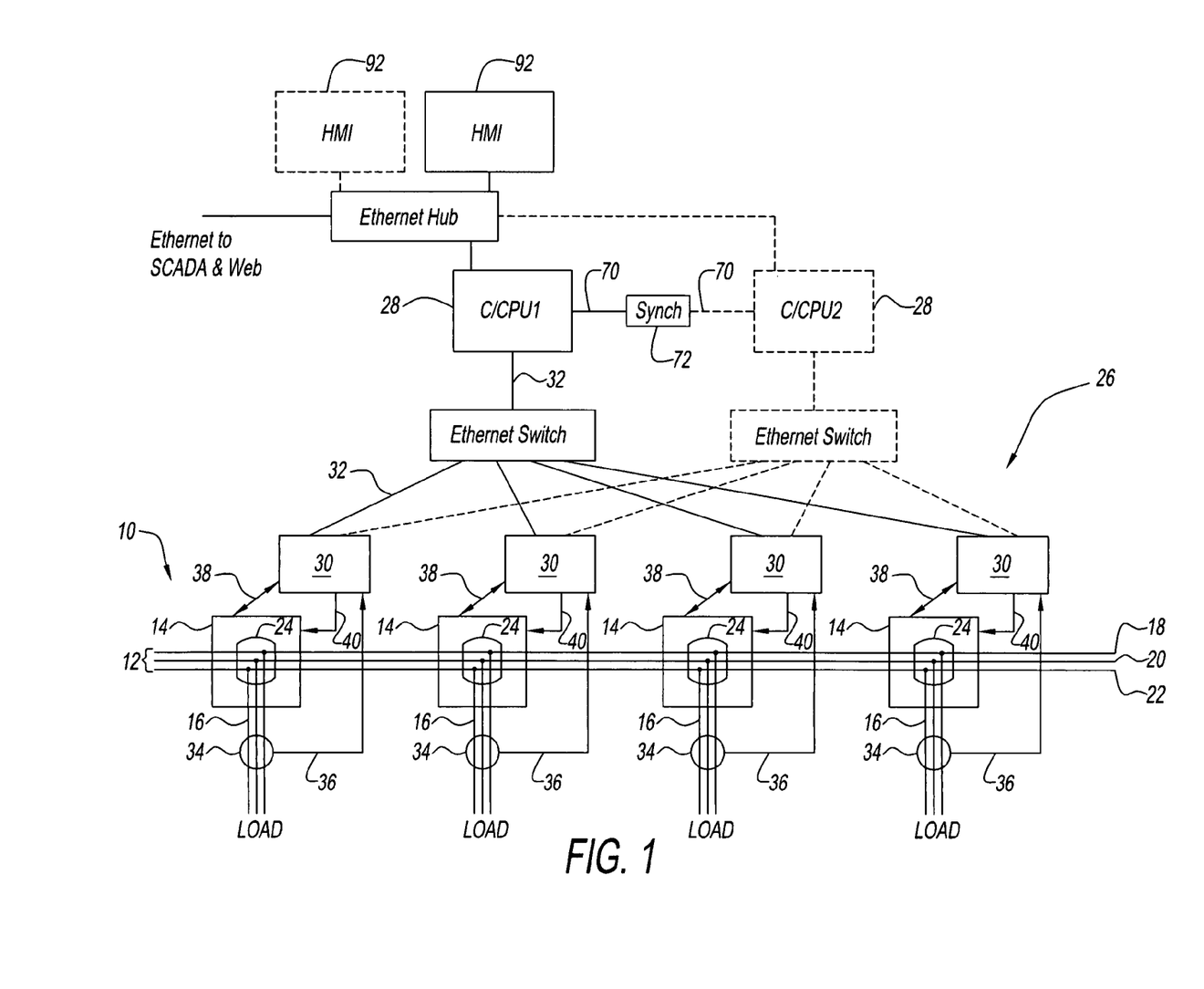
FIG. 1 is a schematic illustration of a power distribution system.

Referring now to the drawings and in particular to FIG. 1, an exemplary embodiment of a power distribution system generally referred to by reference numeral 10 is illustrated. System 10 distributes power from at least one power bus 12 through a number or plurality of power switching devices or circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14 and any topology of circuit breakers, e.g., in series, or in parallel, or other combinations.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 may performs some or all of instantaneous overcurrent protection (IOC), short time overcurrent, longtime overcurrent, relay protection, and logic control as well as digital signal processing functions of system 26. Thus, system 26 enables settings to be changed and data to be logged in a single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition or electrical parameter of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition or electrical parameter of the incoming power in circuits 16 and provide a first or parameter signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position or state of separable contacts 24, a spring charge switch status, a lockout state or condition, and others. In addition, module 30 is configured to operate or actuate circuit breaker 14 by sending one or more third signals 40 to the breaker to open/close separable contacts 24 as desired, such as open/close commands or signals. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for preventing collisions.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
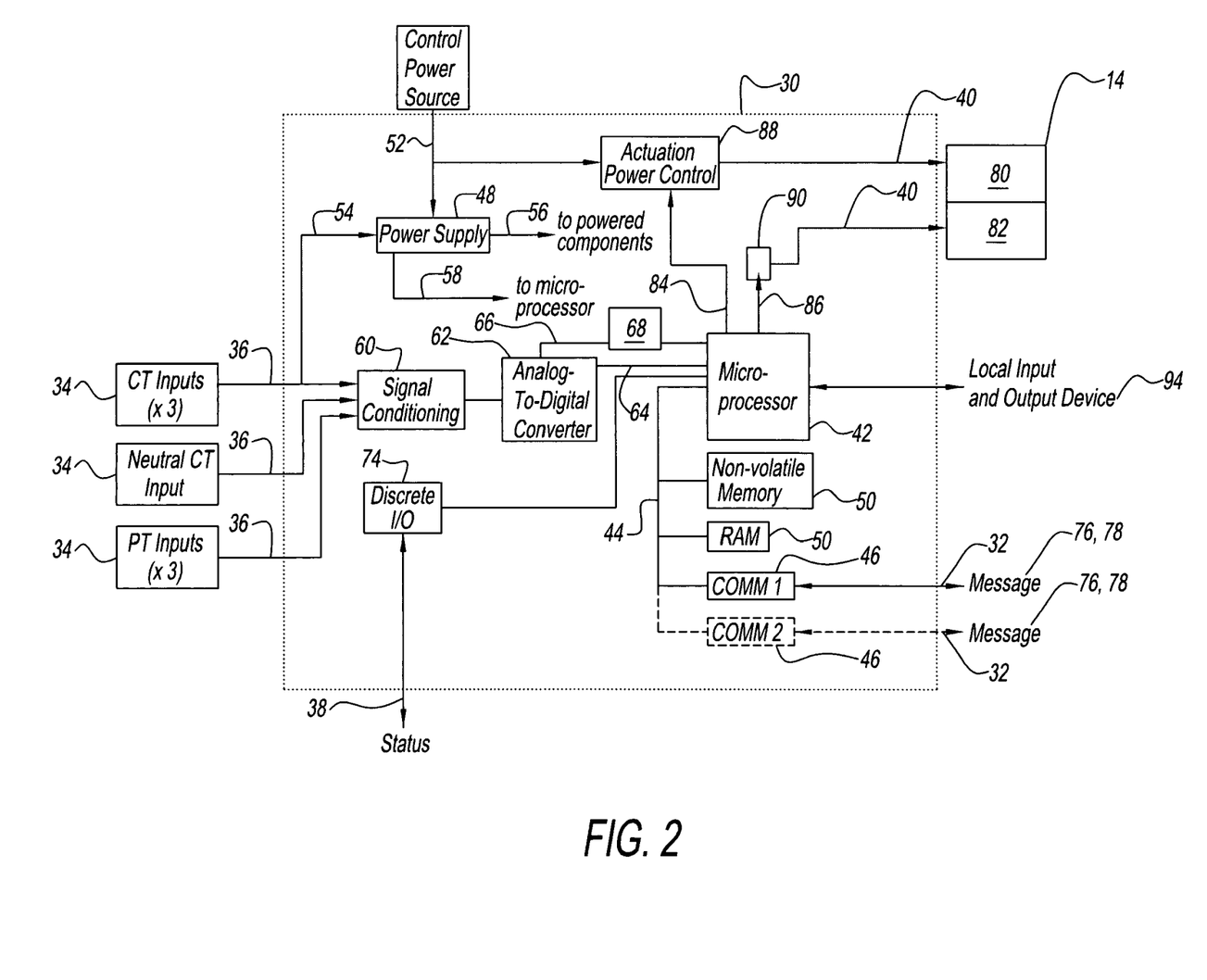
FIG. 2 is a schematic illustration of a module of the power distribution system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can include a filtering circuit (not shown) to improve a signal-to-noise ratio for first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system is synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32, such as open or close commands or signals, or circuit breaker actuation or de-actuation commands or signals.

In response to second message 78, microprocessor 42 causes third signal 40 to operate or actuate (e.g., open contacts 24) circuit breaker 14. Circuit breaker 14 can include more than one operation or actuation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated when only second source 54 is present. In this manner, microprocessor 42 can operate circuit breaker 14 in response to a specified condition, such as, for example, a detected overcurrent, regardless of the state of first and second sources 52, 54. Additionally, a lockout device can be provided that is operably connected to circuit breaker 14.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
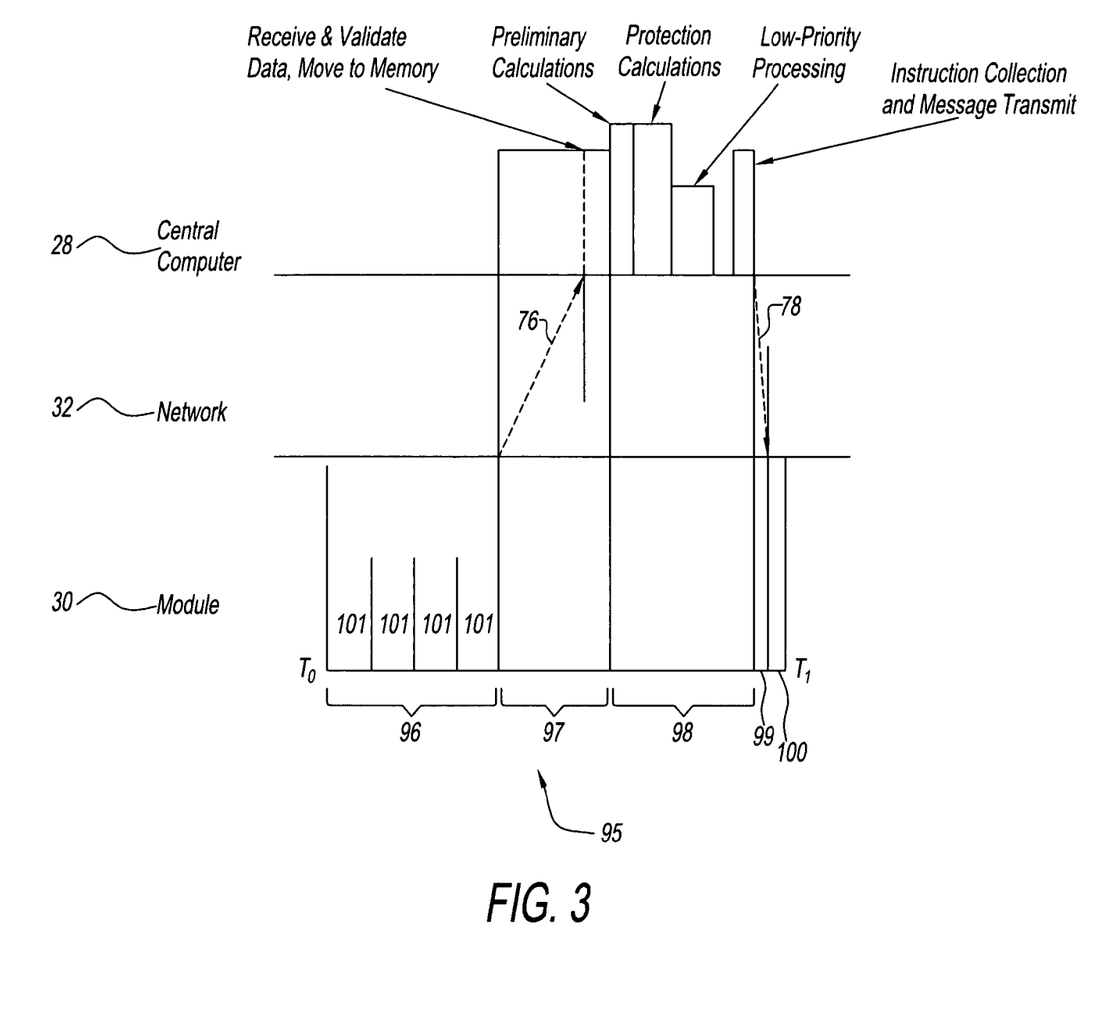
FIG. 3 is a response time for the protection system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.27 ms for data sampling and packaging into first message 76.

Receive/validate time 97 is preferably initiated at a fixed time delay after the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps. Accordingly, CCPU 28 manages the communications and moving of first messages 76 to the CCPU during receive/validate time 97.

The protection processes (i.e., process time 98) starts at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.52 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course, it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Figure 4:
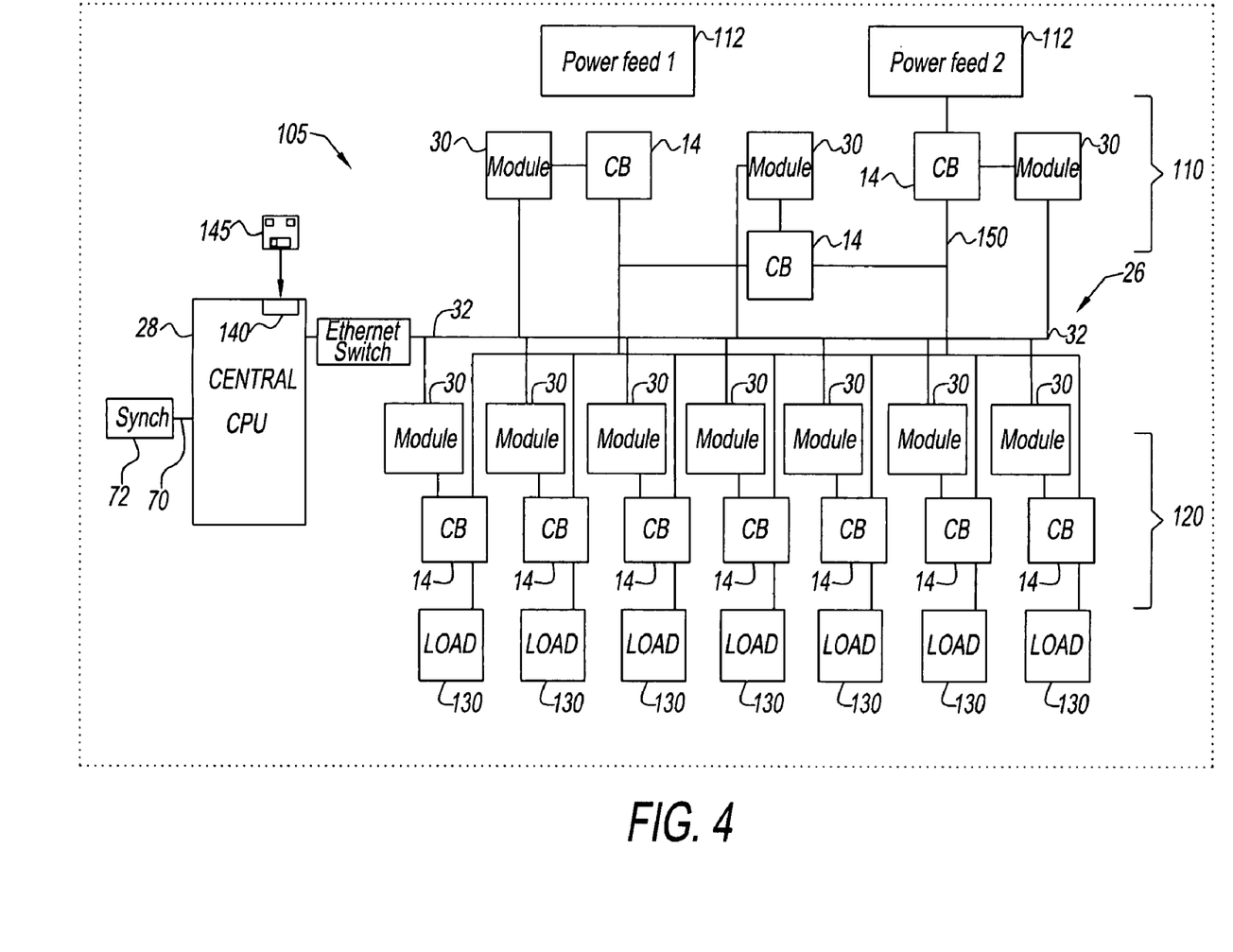
FIG. 4 is a schematic illustration of a multiple source power distribution system.

Referring to FIG. 4, an exemplary embodiment of a multi-source, multi-tier power distribution system generally referred to by reference numeral 105 is illustrated with features similar to the features of FIG. 1 being referred to by the same reference numerals. System 105 functions as described above with respect to the embodiment of FIGS. 1 through 3, and can include the same features but in a multi-source, multi-layer configuration. System 105 distributes power from at least one power feed 112, in this embodiment a first and second power feed, through a power distribution bus 150 to a number or plurality of circuit breakers 14 and to a number or plurality of loads 130. CCPU 28 can include a data transmission device 140, such as, for example, a CD-ROM drive or floppy disk drive, for reading data or instructions from a medium 145, such as, for example, a CD-ROM or floppy disk.

Circuit breakers 14 are arranged in a layered, multi-leveled or multi-tiered configuration with a first level 110 of circuit breakers and a second level 120 of circuit breakers. Of course, any number of levels or configuration of circuit breakers 14 can be used with system 105. The layered configuration of circuit breakers 14 provides for circuit breakers in first level 110 which are upstream of circuit breakers in second level 120. In the event of an abnormal condition of power in system 105, i.e., a fault, protection system 26 seeks to coordinate the system by attempting to clear the fault with the nearest circuit breaker 14 upstream of the fault. Circuit breakers 14 upstream of the nearest circuit breaker to the fault remain closed unless the downstream circuit breaker is unable to clear the fault. Protection system 26 can be implemented for any abnormal condition or parameter of power in system 105, such as, for example, long time, short time or instantaneous overcurrents, or excessive ground currents.

In order to provide the circuit breaker 14 nearest the fault with sufficient time to attempt to clear the fault before the upstream circuit breaker is opened, the upstream circuit breaker is provided with an open command at an adjusted or dynamic delay time. The upstream circuit breaker 14 is provided with an open command at a modified dynamic delay time that elapses before the circuit breaker is opened. In an exemplary embodiment, the modified dynamic delay time for the opening of the upstream circuit breaker 14 is based upon the location of the fault in system 105. Preferably, the modified dynamic delay time for the opening of the upstream circuit breaker 14 is based upon the location of the fault with respect to the circuit breakers and/or other devices and topology of system 105.

CCPU 28 of protection system 26 can provide open commands at modified dynamic delay times for upstream circuit breakers 14 throughout power distribution system 105 depending upon where the fault has been detected in the power flow hierarchy and the modified dynamic delay times for the opening of each of these circuit breakers can preferably be over an infinite range. Protection system 26 reduces the clearing time of faults because CCPU 28 provides open commands at modified dynamic delay times for the upstream circuit breakers 14 which are optimum time periods based upon the location of the fault. It has been found that the clearing time of faults has been reduced by approximately 50% with the use of protection system 26, as compared to the use of contemporary systems.

CCPU 28 coordinates protection system 26 by causing the circuit breaker 14 nearest to the fault to clear the fault. Protection system 26 variably adjusts the dynamic delay time for opening of the upstream circuit breakers 14 to provide backup protection for the downstream circuit breaker nearest the fault. In the event that the downstream circuit breaker 14 nearest the fault is unable to clear the fault, the next upstream circuit breaker will attempt to clear the fault with minimal additional delay based upon its modified dynamic delay time. This reduces system stress, damage and potential arc energy exposure of operating and service personnel while maintaining selectivity. The modified dynamic delay times for the opening of the next nearest circuit breaker that is upstream of the fault can be determined by a zone selective interlock (ZSI) routine. In an exemplary embodiment, the ZSI routine is an algorithm, or the like, performed by CCPU 28 based upon the sample data for the power distribution system 10. CCPU 28 determines the dynamic delay times for the opening of any number of upstream circuit breakers 14 and provides open or actuation commands to open the circuit breakers at the dynamic delay times. In an exemplary embodiment, protection system 26 and CCPU 28 allow the implementation of the ZSI routine to modify the dynamic delay times for opening of any circuit breakers 14 throughout system 105 without the need for additional wiring coupling each of the circuit breakers to one another. CCPU 28 provides an open command to the upstream circuit breakers 14 for opening at dynamic delay times as determined by the ZSI routine.

In an exemplary embodiment, the ZSI routine is performed at CCPU 28 and interacts with the individual protection functions for each module 30, which are also determined at the CCPU. The ZSI routine could also use pre-set clearing times for circuit breakers 14 or the clearing times for the circuit breakers could be determined by CCPU 28 based on the physical hardware, which is known by the CCPU. The CCPU 28 effectively knows the topology of power distribution system 105, which allows the CCPU to open the circuit breakers 14 at an infinite range of times.

In an exemplary embodiment, the protection functions performed at CCPU 28, including the ZSI routine, are based on state information or status of circuit breakers 14, as well as current. Through the use of protection system 26, the state information throughout the power distribution system 105 is known by CCPU 28. The state information is synchronized with the current and the voltage in power distribution system 105. CCPU 28 effectively knows the topology of the power distribution system 105 and uses the state information to track topology changes in the system. CCPU 28 and the ZSI routine utilize the topology information of power distribution system 105 to optimize service and protection.

Of course, it is contemplated by the present disclosure for power distribution system 105 to have any number of tiers or levels and any configuration of branch circuits. The dynamic delay time for opening of any number of circuit breakers 14 upstream of the fault could be modified as described above based upon the location of the fault in the power flow hierarchy. Additionally, the zones of protection and the dynamic delay times can change as the power distribution system 105 changes. In an alternate embodiment, the ZSI routine can modify the dynamic delay time for opening of the upstream circuit breakers 14 based upon other factors using different algorithms. Protection system 26 allows for the dynamic changing of the delay times for opening of circuit breakers 14 throughout the power distribution system 105 based upon any number of factors, including the location of the fault. Protection system 26 also allows for the upstream circuit breaker 14 to enter the pickup mode as a function of the downstream circuit breaker 14 fault current and pickup settings as opposed to its own current and pickup settings.

The embodiments of FIGS. 1 through 4 describe the implementation of the ZSI routine at CCPU 28. However, it is contemplated by the present disclosure that the use of dynamic delay times for opening of circuit breakers 14 and/or the use of the ZSI routine can be implemented in other ways such as, for example, in a distributed control system with supervision by CCPU 28 or a distributed control system with peer to peer communications. In such distributed control systems, the delay time for opening of the upstream circuit breaker 14 will be modified to a dynamic delay time and/or based at least in part on the location of the fault in the power flow hierarchy. The dynamic delay times for the upstream circuit breakers 14 can also be determined and communicated to the upstream circuit breakers and/or circuit breaker actuators operably connected to the breakers.

Protection system 26 provides synchronized, real time, per sample data via network 32 from multiple points of power distribution system 10 to central control processing unit 28. System 26 can perform zone protection for power distribution system 10 through algorithms applied to the sampled data. If determined necessary, a command can be generated and sent via network 32 to cause operation of circuit protection devices, such as, for example circuit breaker 14, a switch, or other power flow control devices. System 26 can also provide real time status of the power devices such as, for example, open or closed status, health, and the availability to perform functions. This information is significant in the real time monitoring of the state or topology of the power distribution system 10 and the zones of protection therein. The opened or closed status of the power switching devices effectively defines the power flow state of the power distribution system 10.

Figure 5:
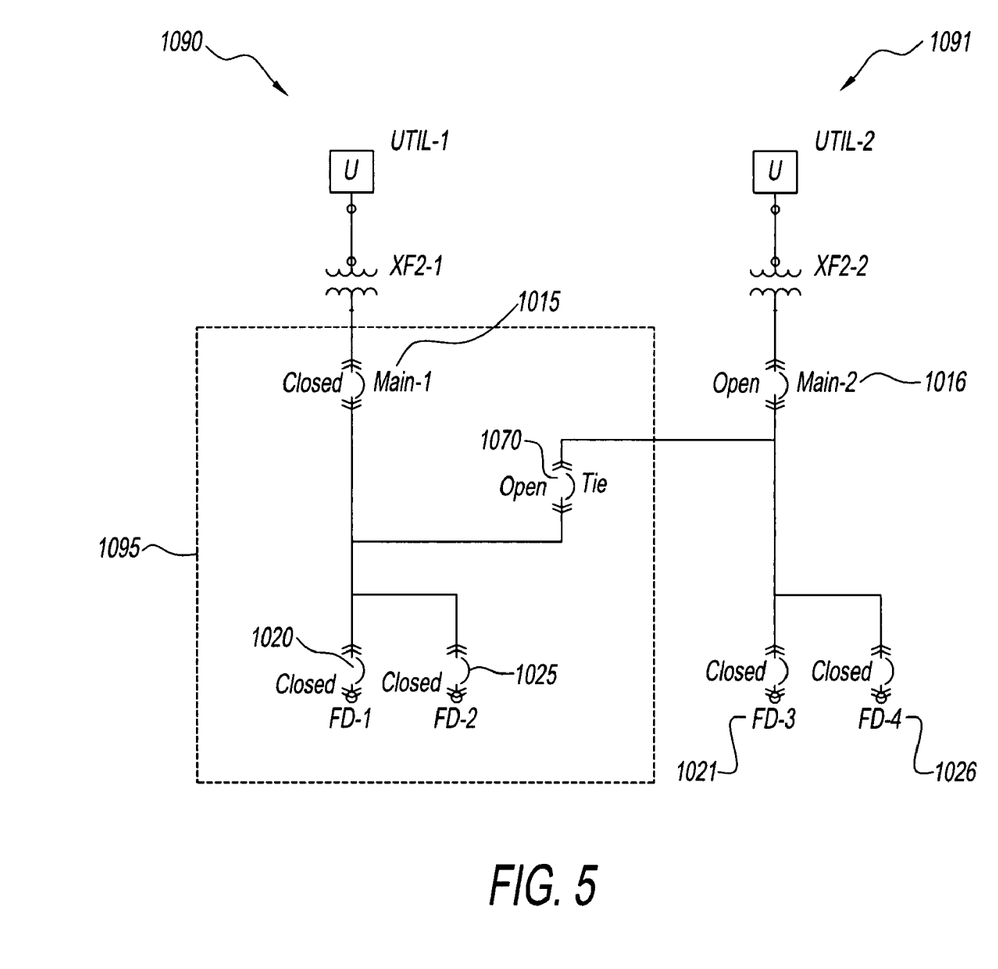
FIG. 5 is a schematic illustration of a portion of the system of FIG. 4 with a first zone of protection.

Referring to FIG. 5, a portion of power distribution system 105 is shown having a first two-tier circuit 1090 and a second two-tier circuit 1091, which are linked by a tie CB 1070. Tie CB 1070 is in an open position. A first zone of protection 1095 is defined by CCPU 28 based on the state or topology of power distribution system 105. The state or topology is the configuration of various power equipment in the power distribution system 105, e.g., power switching devices, such as, for example, circuit breakers 14, which control power flow based upon their actual status, e.g., opened or closed. Zone 1095 includes main-1 CB 1015, feeder-1 CB 1020, feeder-2 CB 1025, and tie CB 1070. Main-2 CB 1016, feeder-3 CB 1021, and feeder-4 CB 1026 have been defined by CCPU 28 as not being members of the zone 1095 but may be members of another zone (not shown). In the state shown in FIG. 5 within zone 1095, and recognized by CCPU 28 as a result of the sample data, main-1 CB 1015 is a power source, feeder-1 CB 1020 is a power sink, and feeder-2 CB 1025 is a power sink. Tie CB 1070 is neither a power source nor a power sink because it is in an opened position.

Zone protective functions for zone 1095 can be carried out in connection with protection system 26 and CCPU 28, as described above. An example of such a zone protective function is bus differential protection. While the following describes application of bus differential protection, the present disclosure contemplates application of all types of zone protective functions, such as, for example, transformer differential, ground fault or zone selective interlock. The bus protection function described herein is merely an example of the dynamic operation of system 26 and its protective capabilities through application of any zone protective functions.

Bus differential protection monitors for a fault by determining if there is a residual current in zone 1095, which fails to pass through the zone. This determination can be made by summation of the power into the zone from the power sources and the power out of the zone from the power sinks. The existence of the residual current can be indicative of a fault in the zone, such as, for example, a phase to ground fault, a phase to neutral fault or a phase to phase fault, and could warrant interruption of the current through zone 1095 to limit damage within power distribution system 105.

On a per phase basis, the bus differential function is defined by equation one:

$$i_r = \| i_{power\ sources} - \| i_{power\ sinks}$$

where $i_r$ is the residual current. The CCPU 28 can determine the existence of a fault based upon $i_r$ exceeding a threshold. Applying equation one to zone 1095 of FIG. 5, provides a bus differential function defined by equation two:

$$i_r = i_{main-1} - (i_{feeder-1} + i_{feeder-2})$$

where $i_{main-1}$ is the current at main-1 CB 1015, $i_{feeder-1}$ is the current at feeder-1 CB 1020, and $i_{feeder-2}$ is the current at feeder-2 CB 1025. If $i_r$ meets or exceeds a threshold value, then CCPU 28 can apply circuit breaker algorithms, such as, for example, instantaneous, fixed delay or inverse time, or other protective functions, to determine when the circuit breaker should be tripped, and preferably to also cause the trip.

Figure 6:
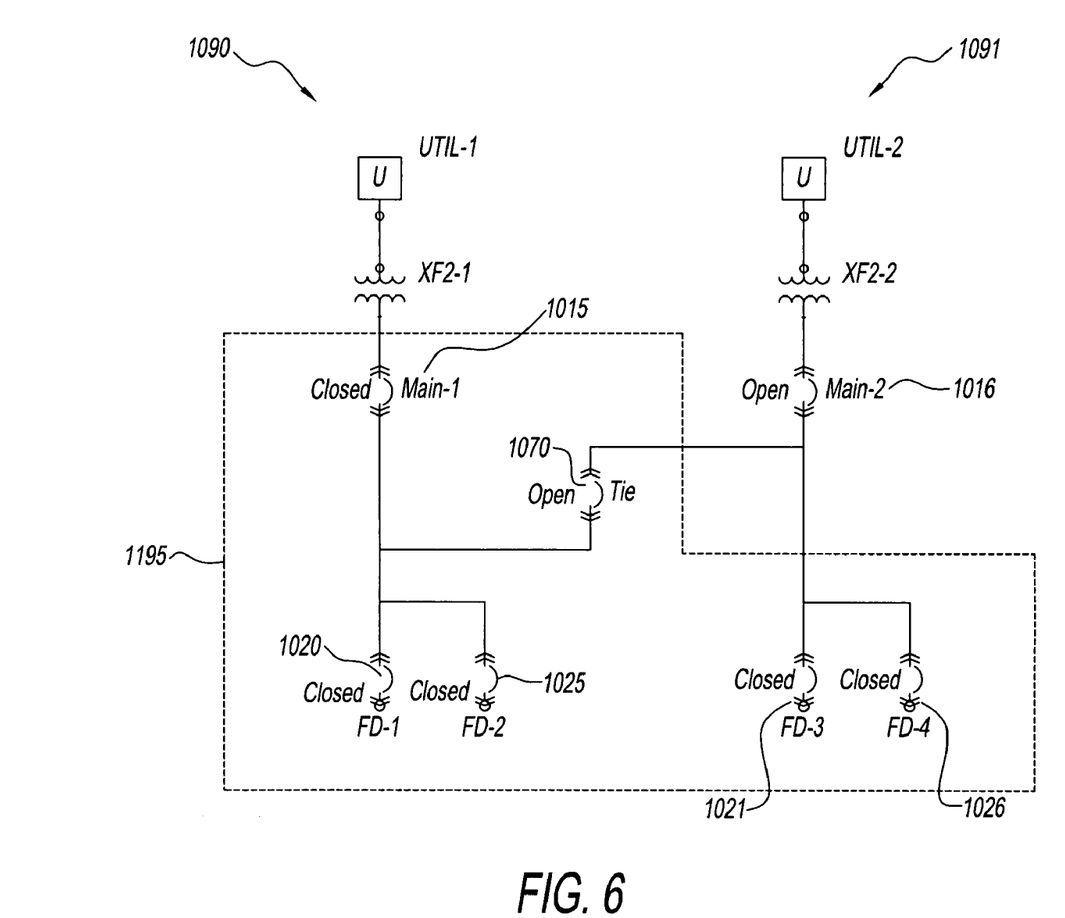
FIG. 6 is a schematic illustration of the portion of the system of FIG. 5 with a second zone of protection.

If the configuration of power distribution system 105 were changed by closing tie CB 1070 (as shown in FIG. 6), then the tie CB would be a power sink of zone 1095. Again applying equation one to zone 1095 where tie CB 1070 is now closed, provides a bus differential function defined by equation three:

$$i_r = i_{main-1} - (i_{feeder-1} + i_{feeder-2} + i_{tie})$$

where $i_{main-1}$ is the current at main-1 CB 1015, $i_{feeder-1}$ is the current at feeder-1 CB 1020, $i_{feeder-2}$ is the current at feeder-2 CB 1025 and $i_{tie}$ is the current at tie CB 1070. CCPU 28 has all of the information for the device status available to it at the same time as all of the information for the current. Based upon the state or topology of power distribution system 105, and, in particular, the state or topology within zone 1095 with tie CB 1070 now closed, CCPU can apply equation three for determining the residual current within the zone. The ability for CCPU 28 to have the state information at the same time as the current, allows CCPU 28 to apply the correct algorithm for the bus differential protection function, and avoids application of the erroneous equation two causing a false trip within zone 1095. The protection function can continue effectively uninterrupted to provide the same protection to the new state, topology or configuration within zone 1095.

Referring to FIGS. 5 and 6, zone 1095 would provide protection for first circuit branch 1090 but would fail to protect second circuit branch 1091, and, in particular, feeder-3 CB 1021 and feeder-4 CB 1026, which are supplied power from the first circuit through tie CB that is now closed. As shown in FIG. 6, CCPU 28 can redefine the zone of protection for this portion of the circuit as zone 1195. Zone 1195 further includes feeder-3 CB 1021 and feeder-4 CB 1026, which are in parallel with feeder-1 CB 1020 and feeder-2 CB 1025. Applying equation one to zone 1195, provides a bus differential function defined by equation four:

$$i_r = i_{main-1} - (i_{feeder-1} + i_{feeder-2} + i_{feeder-3} + i_{feeder-4})$$

where $i_{main-1}$ is the current at main-1 CB 1015, $i_{feeder-1}$ is the current at feeder-1 CB 1020, $i_{feeder-2}$ is the current at feeder-2 CB 1025, $i_{feeder-3}$ is the current at feeder-3 CB 1021, and $i_{feeder-4}$ is the current at feeder-4 CB 1026. With the device status information available and the current available, CCPU 28 can apply the bus differential protection function for zone 1195 as defined by equation four. In addition to the change in the algorithm that is applied to protect zone 1195, there are now more members of the zone, i.e., feeder-3 CB 1021 and feeder-4 CB 1026, which introduce additional errors due to the summation in this particular algorithm. CCPU 28 can also change the pickup points and change the tolerances to compensate for these additional errors.

Figure 7:
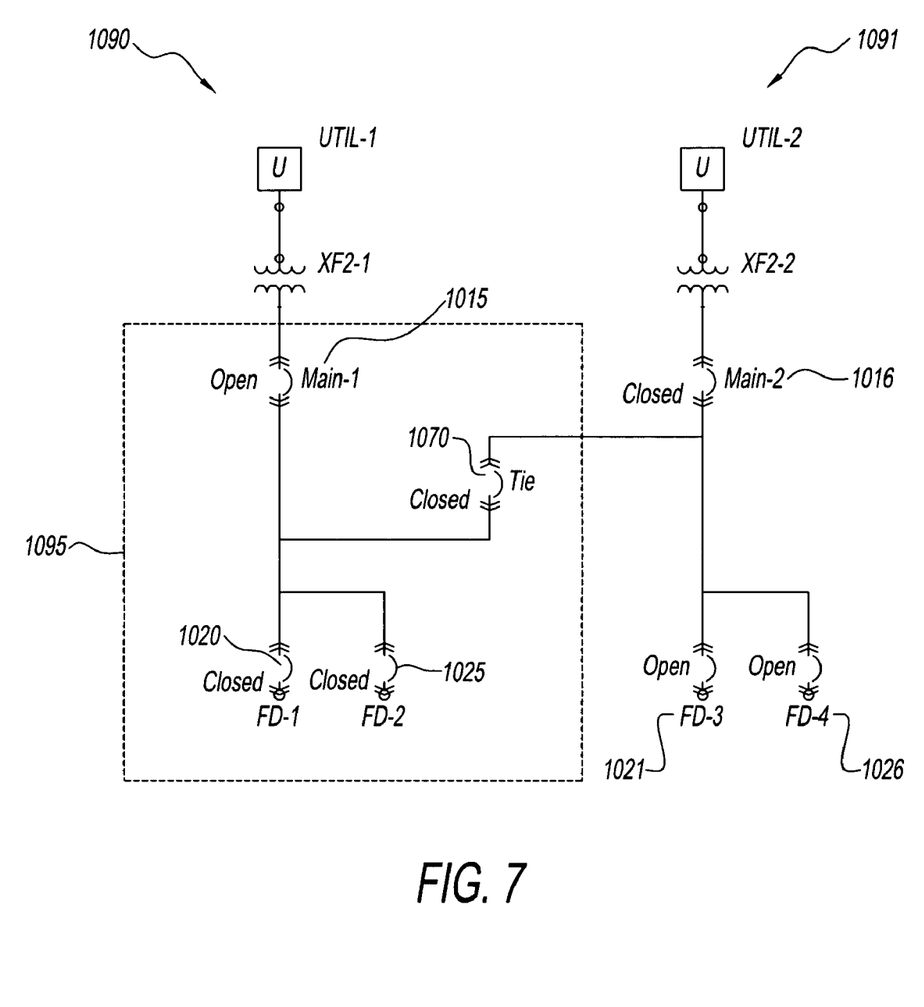
FIG. 7 is a schematic illustration of the portion of the system of FIG. 5 with the first zone of protection and a different topology.

Referring to FIG. 7, a further change in the configuration of power distribution system 105 where main-1 CB 1015, feeder-3 CB 1021 and feeder-4 CB 1026 are opened, and where main-2 CB 1016 is closed, results in a change in the direction of power flow. CCPU 28 recognizes the change in state, topology or configuration of the system, including the change in direction of power flow, and can again redefine a zone of protection as zone 1095 with tie CB 1070 being the power source for the zone. Applying equation 1 to zone 1095, provides a bus differential function defined by equation five:

$$i_r = (i_{main-1} + i_{tie}) - (i_{feeder-1} + i_{feeder-2})$$

where $i_{main-1}$ is the current at main-1 CB 1015 (zero in this case), $i_{tie}$ is the current at tie CB 1070, $i_{feeder-1}$ is the current at feeder-1 CB 1020, and $i_{feeder-2}$ is the current at feeder-2 CB 1025. With the device status information available and the current available, CCPU 28 can apply the bus differential protection function for zone 1095 as correctly defined by equation five rather than equation four which is now inapplicable.

Protection system 26 provides dynamic zone protection for power distribution system 105 based upon the changing state, topology or configuration of the power distribution system. The protection system can adjust the zones of protection throughout the power distribution system 105 based upon adjustments to the configuration of the power distribution system, or based upon other factors, such as, for example, priority of protection. The synchronized, per sample data protection of protection system 26, including CCPU 28, allows for performance of sample by sample calculations. The synchronization of the data is significant because the difference of the currents is a vector quantity. If the data were not synchronized, the phase shift of the data could result in erroneous residual currents. Also, the use of sample by sample calculations provides the true root-mean-square values of the residual current including harmonics preferably up to half of the sampling frequency.

The dynamic operation of protection system 26 also allows for monitoring the health or status of the data collection devices, such as modules 30. The data for the health or status of the devices is preferably synchronized with data for the topology and other electrical parameters, such as, for example, the current. Algorithms, including internal self-health algorithms, in conjunction with the other electrical parameters, such as current, voltage and/or device status, can be used to provide for alteration or suspension of the particular protection functions in the event of a data collection error. For example, protection system 26 can recognize A/D conversion failing to function because the data ready interrupt of the A/D converter 62 is never received. This error condition would be reported to CCPU 28. If the missing data were not considered in the protection function, then the calculated residual current could be erroneously high resulting in an unwarranted or nuisance trip within the power distribution system 105 because of a lack of the complete set of data.

The dynamic zone protection provided by protection system 26 is based in part upon current and/or voltage calculations from multiple circuit points that are power sources or power sinks, and connected in parallel or in series. The state or topology of the system is recognized and effectively evaluated at the same speed as the current and/or voltage calculations. Protection system 26 can recognize and redefine the circuit points as power sources or power sinks, and whether they are in series or in parallel. Based upon the topology of the power distribution system 105, entirely different zone protective functions may be defined and applied. The protection system 26 can define a plurality of zones of protection throughout the power distribution system 105, and can dynamically adjust the plurality of zones as the topology of the power distribution system changes.

Protection system 26 provides a computationally efficient technique for performing a plurality of different zone protective functions for each of the dynamic zones of protection. System 26 provides for simultaneous performance of multiple zone protective functions for each of the dynamic zones. System 26 is capable of making and carrying out multiple protective decisions for zones of protection within time periods that decrease damage in the event of a fault within power distribution system 105. System 26 can also perform these multiple zone protection functions on a plurality of zones of protection that are changing as the topology of the power distribution system 105 changes.

In an exemplary embodiment, protection system 26 creates a zone protection matrix for each of the zones of protection. The protection matrix defines the characteristics and configurations, including possible characteristics and possible configurations, of each of the dynamic zones of protections, such as, for example, members, status, power flow directions, and settings for different possible states of the zones. Each of the different zone protective functions for the same zone of protection can use the protection matrix to define the actual characteristics of the zone, including any coefficients associated with those characteristics and necessary to the performance of the zone protective function, as opposed to each zone protective function individually defining the characteristics of the zone before performing the protective function.

Protection system 26 can populate a zone state matrix with members, e.g., power switching devices, such as, for example, circuit breakers 14, based upon their individual status and their control of the power, e.g., allowing power flow, preventing power flow, or changing power flow direction. The zone state matrix defines all of the possible combinations of the members. The zone state matrix can then be used to select the correct, pre-defined protection matrix. The individual zone protective functions can then use the protection matrix to establish the true characteristics from the pre-defined characteristics of the zone, which are necessary for performing the particular zone protective functions. The protection matrix is effectively a matrix of coefficients used by the zone protective functions to increase computational efficiency and the coefficients are pre-defined for all possible configurations of the zone.

Figure 8:
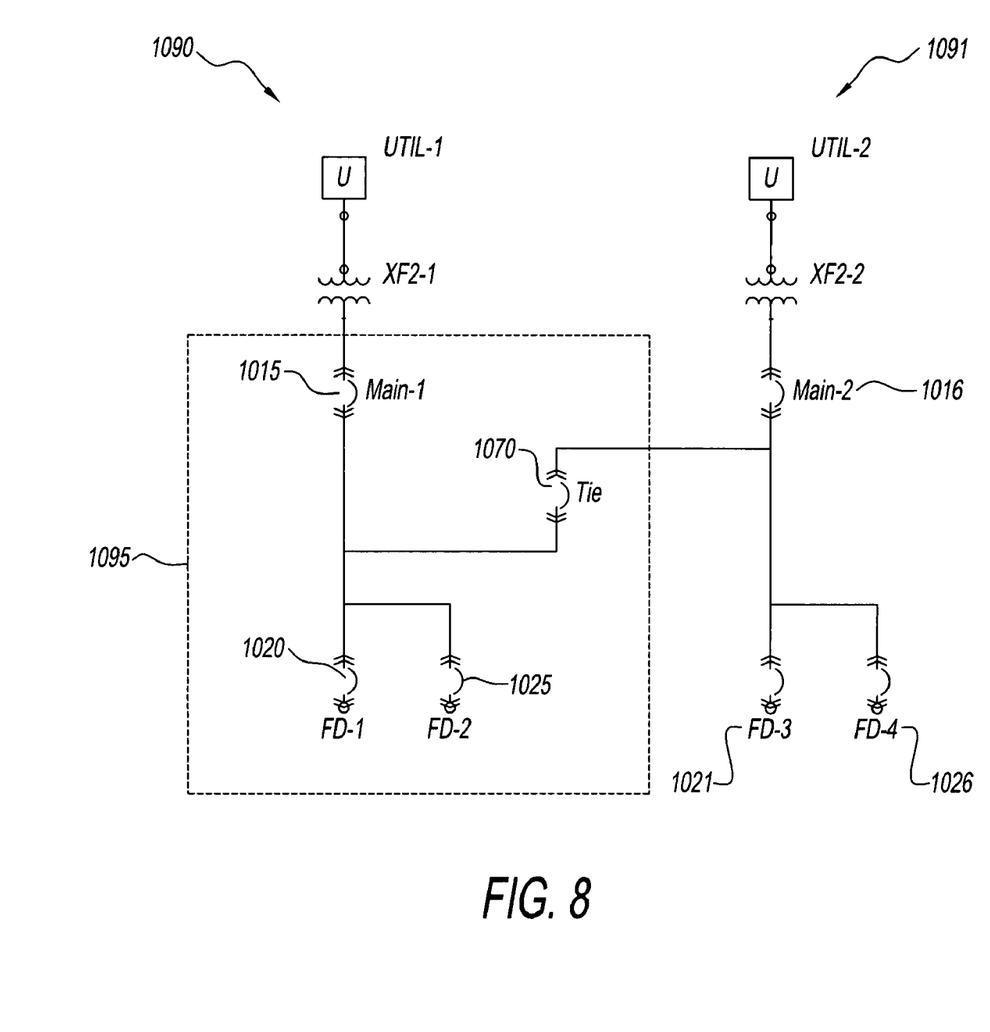
FIG. 8 is a schematic illustration of the portion of the system of FIG. 5 with the first zone of protection.

Referring to FIG. 8, first and second circuit branches 1090, 1091 are shown with zone of protection 1095. For zone 1095, main-1 CB 1015, main-2 CB 1016 and tie CB 1070 control the power flow characteristics including the series or parallel connectivity of the downstream circuit breakers. Of course, the present disclosure contemplates any number or arrangement of power switching devices in the zone of protection. Based upon these controlling members of zone 1095, there are three sources that each have two possible states (opened=0 or closed=1) resulting in eight possible zone states or topologies, i.e., combinations of possible states for the controlling members. Table one defines the zone state matrix for zone 1095 of FIG. 8, including the eight potential or possible zone states:

TABLE 1

| State | Tie CB | Main-1 CB | Main-2 CB |
|---|---|---|---|
| 0 | 0 | 0 | 0 |
| 1 | 0 | 0 | 1 |
| 2 | 0 | 1 | 0 |

TABLE 1-continued

| State | Tie CB | Main-1 CB | Main-2 CB |
|---|---|---|---|
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Referring to the portion of power distribution system 105 shown in FIG. 8 and the zone state matrix table one, there are four power flow configurations or paths that would result from the eight possible states for the members of zone 1095. The first configuration (normal) for zone 1095 is where main-1 CB 1015 and/or main-2 CB 1016 are providing power for first and second circuit branches 1090, 1091, respectively, and tie CB 1070 is opened. The second configuration (left feed) for zone 1095 is where main-1 CB 1015 is closed, main-2 CB 1016 is opened, and tie CB 1070 is closed so that main-1 CB is providing power for first and second circuit branches 1090, 1091. The third configuration (right feed) for zone 1095 is where main-1 CB 1015 is opened, main-2 CB 1016 is closed, and tie CB 1070 is closed so that main-2 CB is providing power for first and second circuit branches 1090, 1091. The fourth configuration (paralleled) for zone 1095 is where main-1 CB 1015 is closed, main-2 CB 1016 is closed, and tie CB 1070 is closed so that main-1 CB and main-2 CB are providing power for first and second circuit branches 1090, 1091, in parallel. Table two defines a zone definition matrix for zone 1095 of FIG. 8, based upon these four power flow configurations for the eight possible states of the zone:

TABLE 2

| State | Tie CB | Main-2 CB | Main-1 CB | Power Flow Configuration |
|---|---|---|---|---|
| 0 | 0 | 0 | 0 | 1 |
| 1 | 0 | 0 | 1 | 1 |
| 2 | 0 | 1 | 0 | 1 |
| 3 | 0 | 1 | 1 | 1 |
| 4 | 1 | 0 | 0 | 2 (or 3) |
| 5 | 1 | 0 | 1 | 2 |
| 6 | 1 | 1 | 0 | 3 |
| 7 | 1 | 1 | 1 | 4 |

Each of the eight possible states of the members of zone 1095 does not result in a unique power flow configuration but rather only four possible power flow configurations. For state 4 of zone 1095, where both main-1 CB 1015 and main-2 CB 1016 are opened and tie CB 1070 is closed, either power flow configuration 2 or 3 could have been used. The zone state matrix, an example of which is shown in table one, can be used for determining the correct, pre-defined zone protection matrix.

As described above, an example of a zone protective function is bus differential protection. While the following describes application of bus differential protection with use of the protection matrix for the zone of protection, the present disclosure contemplates application of all types of zone protective functions to be used with the matrix technique described herein. The bus protection function is merely an example of the dynamic operation of system 26 and an exemplary embodiment of the matrix technique to increase the efficiency of application of zone protective functions by system 26.

Referring to table three, a portion of a protection matrix is shown for zone 1095, which has been derived from the definition matrix of table two for zone 1095:

TABLE 3

| Power Flow Configuration | Function ID | Run | ID | Name | Member Direction | Pickup | Curve | Delay |
|---|---|---|---|---|---|---|---|---|
| 1 | 1 | 1 | 1 | Main-1 | 1 | 400 | Fixed t | 0.1 |
|   |   |   | 2 | Main-2 | 0 |   |   |   |
|   |   |   | 3 | Tie | 0 |   |   |   |
|   |   |   | 4 | Feed-1 | −1 |   |   |   |
|   |   |   | 5 | Feed-2 | −1 |   |   |   |
|   |   |   | 6 | Feed-3 | 0 |   |   |   |
|   |   |   | 7 | Feed-4 | 0 |   |   |   |
| 2 | 1 | 1 | 1 | Main-1 | 1 | 800 | Fixed t | 0.1 |
|   |   |   | 2 | Main-2 | 0 |   |   |   |
|   |   |   | 3 | Tie | −1 |   |   |   |
|   |   |   | 4 | Feed-1 | −1 |   |   |   |
|   |   |   | 5 | Feed-2 | −1 |   |   |   |
|   |   |   | 6 | Feed-3 | 0 |   |   |   |
|   |   |   | 7 | Feed-4 | 0 |   |   |   |
| 3 | 1 | 1 | 1 | Main-1 | 0 | 400 | Fixed t | 0.1 |
|   |   |   | 2 | Main-2 | 0 |   |   |   |
|   |   |   | 3 | Tie | 1 |   |   |   |
|   |   |   | 4 | Feed-1 | −1 |   |   |   |
|   |   |   | 5 | Feed-2 | −1 |   |   |   |
|   |   |   | 6 | Feed-3 | 0 |   |   |   |
|   |   |   | 7 | Feed-4 | 0 |   |   |   |
| 4 | 1 | 0 | 1 | Main-1 | 0 | n/a | n/a | n/a |
|   |   |   | 2 | Main-2 | 0 |   |   |   |
|   |   |   | 3 | Tie | 0 |   |   |   |
|   |   |   | 4 | Feed-1 | 0 |   |   |   |
|   |   |   | 5 | Feed-2 | 0 |   |   |   |
|   |   |   | 6 | Feed-3 | 0 |   |   |   |
|   |   |   | 7 | Feed-4 | 0 |   |   |   |

In the protection matrix of table three, for the "Member Direction", a 1 represents a source, while a −1 represents a sink. "Function ID" is the particular protective function for this portion of the protection matrix, which in this example is bus differential. "Run" is a single logical variable, which can be used for controlling whether the protective function will be carried out for a particular power flow configuration. For example, when zone 1095 is in power flow configuration 4, i.e., main-1 CB 1015, main-2 CB 1016 and tie CB 1070 are all closed so that first and second circuits 1090, 1091 are powered in parallel by main-1 CB and main-2 CB, then "Run" is set to zero so that the bus differential will not be applied.

"ID" is the reference to the particular power switching device and "Name" is included for conveniently identifying the device. "Member Direction" defines which power switching devices, i.e., members, are in zone 1095 and also their power flow. "Pickup", "Curve" and "Delay" are the settings for the particular protective function for zone 1095.

"ID" and "Member Direction" are vector quantities. The member direction vector is the coefficient that can be used in the relay function. The values for the member direction vectors in table three for power flow configurations 1, 2, and 3 correspond to equations one, two, and four, as described-above with respect to the bus differential protection function. The protection coefficient can be defined by:

$$[C]$$

where [C] is the protection coefficient matrix with elements $c_{m,n}$, where m is the power flow configuration, and mn is the current for nth member. Using this protection coefficient, the bus differential protection equation, for all power flow configurations is:

$$\{i_r\} = [C] * \{i\}$$

where $\{i\}$ is the system current vector and $\{i_r\}$ is the residual current vector for n power flow configurations.

The resulting protection matrix for each power flow configuration can be defined once for the zone 1095 and can be done off-line of the real-time zone protection processing. System 26 can reference the protection matrix during the protection pass in connection with the synchronized, real time, per sample data, which includes the actual status of the power switching devices, in order to apply the appropriate algorithm for the desired zone protection function. The protection matrix accounts for the possible characteristics or configurations of each of the zones of protection and defines the zone protection function coefficients for each of these possible characteristics or configurations. System 26 and CCPU 28 are provided with the topology of the zone of protection and can reference the protection matrix for the actual characteristics and configurations, as well as the zone protection function coefficients, to perform the zone protective function.

While the exemplary embodiment describes the use of a matrix technique to improve the computational efficiency associated with the zone protective functions performed by system 26, the present disclosure contemplates the use of other techniques, with or without matrices, that provide for pre-defining of the actual and possible characteristics of the zone of protection. System 26 can then reference the pre-defined characteristics, and the zone protective coefficients derived from these characteristics, during the performance of the zone protective function. This reduces performance time associated with individually defining the actual characteristics of the zone of protection for each of the zone protective functions.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of protecting a circuit having power switching devices, the method comprising:
    defining characteristics of a zone of protection of the circuit;
    defining a protection matrix based at least in part upon said characteristics;
    performing a zone protective function on said zone of protection using said protection matrix, wherein said protection matrix comprises a matrix of protection coefficients used by said zone protective function, wherein the step of performing said zone protective function is based at least in part upon electrical parameters of said zone of protection, said electrical parameters being communicated over a data network to a microprocessor, said microprocessor performing said zone protective function; and
    controlling said microprocessor to perform instantaneous overcurrent protection of the switching devices based at least in part on said electrical parameters.

2. The method of claim 1, wherein said zone protective function is a plurality of zone protective functions, each of said plurality of zone protective functions being performed on said zone of protection based at least in part upon said protection matrix.

3. The method of claim 1, further comprising sensing said electrical parameters with a sensor, communicating signals representative of said electrical parameters to a module, and communicating said signals to said microprocessor, wherein said module, said sensor and said microprocessor are communicatively coupled over said data network.

4. The method of claim 1, further comprising:
monitoring a topology of the circuit, said topology being based at least in part upon a status for each of the power switching devices in the circuit, said status being either opened or closed;
defining said zone of protection based at least in part upon said topology; and
adjusting said zone of protection based at least in part upon changes to said topology.

5. The method of claim 1, wherein the step of defining said characteristics comprises defining a plurality of combinations of states of the power switching devices in said zone of protection, each of said states being either opened or closed.

6. The method of claim 5, wherein the step of defining said characteristics further comprises defining power flow configurations for said zone of protection based upon said plurality of combinations of said states of the power switching devices in said zone of protection.

7. The method of claim 6, further comprising:
defining a definition matrix based at least in part upon said power flow configurations; and
defining said protection matrix based at least in part upon said definition matrix.

8. The method of claim 5, further comprising:
defining a zone state matrix based upon said plurality of combinations of said states of the power switching devices in said zone of protection; and
defining said protection matrix based at least in part upon said zone state matrix.

9. The method of claim 5, further comprising opening at least one of the power switching devices in said zone of protection based upon said zone protective function.

10. The method of claim 9, wherein a microprocessor is configured to operate each of the power switching devices in the circuit.

11. A method of protecting a circuit having power switching devices, the method comprising:
defining characteristics of a zone of protection of the circuit;
defining a protection matrix based at least in part upon said characteristics;
performing a zone protective function on said zone of protection using said protection matrix;
determining a dynamic delay time for opening said at least one of the power switching devices;
opening said at least one of the power switching devices after said dynamic delay time has elapsed, wherein the step of performing said zone protective function is based at least in part upon electrical parameters of said zone of protection, said electrical parameters being communicated over a data network to a microprocessor, said microprocessor performing said zone protective function; and
controlling said microprocessor to perform instantaneous overcurrent protection of the switching devices based at least in part on said electrical parameters.

12. A method of protecting a circuit having power switching devices, the method comprising:
defining a plurality of combinations of states of the power switching devices disposed in a zone of protection of the circuit, each of said states being either opened or closed;
defining characteristics of said zone of protection based at least in part upon said plurality of combinations of said states of the power switching devices disposed in said zone of protection, said characteristics being actual and possible characteristics;
performing a zone protective function on said zone of protection based at least in part upon said characteristics;
determining a dynamic delay time for opening said at least one of the power switching devices;
opening said at least one of the power switching devices after said dynamic delay time has elapsed, wherein the step of performing said zone protective function is based at least in part upon electrical parameters of said zone of protection, said electrical parameters being communicated over a data network to a microprocessor, said microprocessor performing said zone protective function; and
controlling said microprocessor to perform instantaneous overcurrent protection of the switching devices based at least in part on said electrical parameters.

13. The method of claim 12, wherein said zone of protection is dynamic.

14. The method of claim 12, wherein the step of defining said characteristics comprises defining power flow configurations for said zone of protection based upon said plurality of combinations of said states of the power switching devices disposed in said zone of protection.

15. The method of claim 12, wherein said zone protective function is a plurality of zone protective functions, each of said plurality of zone protective functions being performed on said zone of protection based at least in part upon said characteristics of said zone of protection.

16. The method of claim 12, further comprising sensing said electrical parameters with a sensor, communicating signals representative of said electrical parameters to a module, and communicating said signals to said microprocessor, wherein said module, said sensor and said microprocessor are communicatively coupled over said data network.

17. The method of claim 12, further comprising:
monitoring a topology of the circuit, said topology being based at least in part upon a status for each of the power switching devices in said circuit, said status being either opened or closed;
defining said zone of protection based at least in part upon said topology; and
adjusting said zone of protection based at least in part upon changes to said topology.

18. The method of claim 12, further comprising opening at least one of the power switching devices in said zone of protection based at least in part upon said zone protective function.

19. The method of claim 18, wherein a microprocessor is configured to operate each of the power switching devices in said circuit.

20. A protection system for coupling to a circuit having power switching devices and a zone of protection, the system comprising:
a control processing unit being communicatively coupleable to the power switching devices so that said control processing unit can perform all primary power distribution functions for the circuit and so that said control processing unit can perform a zone protective function on said zone of protection based at least in part upon characteristics of said zone of protection, said characteristics being actual and possible characteristics,
wherein said control processing unit utilizes a protection matrix to perform said zone protective function, said protection matrix being defined at least in part by said characteristics of said zone of protection, and wherein said protection matrix comprises a matrix of protection coefficients used by said zone protective function, further comprising a data network in communication with said control processing unit and communicatively coupleable to the power switching devices.

21. The system of claim 20, wherein said characteristics are defined at least in part by a plurality of configurations for said zone of protection, said plurality of configurations being based at least in part upon states of the power switching devices disposed in said zone of protection, each of said states being either opened or closed.

22. The system of claim 21, wherein said characteristics are based at least in part upon power flow paths for said zone of protection, said power flow paths being based upon said states of said power switching devices disposed in said zone of protection.

23. The system of claim 20, wherein said control processing unit defines said zone of protection.

24. The system of claim 23, wherein said zone of protection is dynamic.

25. The system of claim 20, wherein said control processing unit monitors a topology of the circuit, said topology being based at least in part upon a status for each of the power switching devices in the circuit, said status being either opened or closed, wherein said control processing unit defines said zone of protection based at least in part upon said topology, and wherein said control processing unit adjusts said zone of protection based at least in part upon changes to said topology.

26. The system of claim 20, wherein said zone protective function is a plurality of zone protective functions, each of said plurality of zone protective functions being performed on said zone of protection based at least in part upon said characteristics of said zone of protection.

27. The system of claim 20, wherein said control processing unit operatively controls the power switching devices.

28. The system of claim 20, wherein said control processing unit receives parameter signals representative of electrical parameters of the circuit, and wherein said control processing unit opens the power switching devices if a fault is detected in the circuit.

29. The system of claim 28, further comprising a module and a sensor, said module being in communication with the power switching devices, said sensor and said control processing unit, wherein said sensor senses said electrical parameters and communicates said parameter signals to said module, and wherein said module communicates said parameter signals to said control processing unit.

30. The system of claim 20, wherein said control processing unit opens at least one of the power switching devices in said zone of protection based at least in part upon said zone protective function.

31. The system of claim 20, wherein said control processing unit determines a dynamic delay time for opening at least one of the power switching devices, and wherein said at least one of the power switching devices is opened after said dynamic delay time has elapsed.

32. A power distribution system comprising:
a circuit having power switching devices and a zone of protection; and
a control processing unit communicatively coupled to said power switching devices, wherein said control processing unit performs all primary power distribution functions for the circuit power distribution system and performs a zone protective function on said zone of protection based at least in part upon characteristics of said zone of protection, said characteristics being actual and possible characteristics, wherein said control processing unit determines a dynamic delay time for opening at least one of said power switching devices, and wherein said at least one of said power switching devices is opened after said dynamic delay time has elapsed, further comprising a data network in communication with said control processing unit and said power switching devices.

33. The system of claim 32, wherein said characteristics are defined at least in part by a plurality of configurations for said zone of protection, said plurality of configurations being based at least in part upon states of said power switching devices disposed in said zone of protection, each of said states being either opened or closed.

34. The system of claim 32, wherein said characteristics are based at least in part upon power flow paths for said zone of protection, said power flow paths being based upon said states of said power switching devices disposed in said zone of protection.

35. The system of claim 32, wherein said control processing unit defines said zone of protection.

36. The system of claim 35, wherein said zone of protection is dynamic.

37. The system of claim 32, wherein said control processing unit monitors a topology of said circuit, said topology being based at least in part upon a status for each of said power switching devices in said circuit, said status being either opened or closed, wherein said control processing unit defines said zone of protection based at least in part upon said topology, and wherein said control processing unit adjusts said zone of protection based at least in part upon changes to said topology.

38. The system of claim 32, wherein said zone protective function is a plurality of zone protective functions, each of said plurality of zone protective functions being performed on said zone of protection based at least in part upon said characteristics of said zone of protection.

39. The system of claim 32, wherein said control processing unit operatively controls said power switching devices.

40. The system of claim 32, wherein said control processing unit receives parameter signals representative of electrical parameters of said circuit, and wherein said control processing unit opens said power switching devices if a fault is detected in said circuit.

41. The system of claim 40, further comprising a data sample and transmission module and a sensor, said module being in communication with said power switching devices, said sensor and said control processing unit, wherein said sensor senses said electrical parameters and communicates said parameter signals to said module, and wherein said module communicates said parameter signals to said control processing unit.

42. The system of claim 32, wherein said control processing unit opens at least one of said power switching devices based upon said zone protective function.

43. The system of claim 32, wherein said control processing unit utilizes a protection matrix to perform said zone protective function, said protection matrix being defined at least in part by said characteristics of said zone of protection.

* * * * *